Patented Feb. 1, 1927.

1,615,908

UNITED STATES PATENT OFFICE.

HERMANN MÜLLER, OF BASEL, SWITZERLAND, ASSIGNOR TO T. R. GEIGY A. G., OF BASEL, SWITZERLAND, A FIRM.

PRINTING PASTE AND PROCESS FOR THE PREPARATION THEREOF.

No Drawing. Original application filed September 19, 1924, Serial No. 738,720, and in Germany October 22, 1923. Divided and this application filed January 22, 1926. Serial No. 83,134.

This application is a divisional one of the application Ser. No. 738,720, filed September 19, 1924.

While glycerine, acetine (glycerine acetic acid ester) and other usual products used as solvents for organic dyestuffs in many cases do not give any satisfactory results in the printing industry, printing pastes made with ethylenechlorhydrin have shown in a surprising manner that they yield excellent prints, which are purer and fuller than those produced by the additions known up to the present and according to the usual methods of working.

The above mentioned solvent has the great advantage over ethylene-thiodiglycol employed for similar purposes in the German Patents Nos. 339,600 and 340,552, in that it possesses no disagreeable smell, it gives purer and brighter shades, it is simpler to produce and easier to obtain.

Ethylenechlorhydrin has a greater power of dissolving many dyestuffs and when employed as addition to the printing pastes ensures a better penetration of the fibres than is the case with glycerine and acetine. This particular substance the employment of which in printing is novel permits the preparation of acid-free printing pastes which do not weaken the fibres and the use of which is of great importance particularly for the printing of weighted silk. Without the durability of the fibres being lessened, intensive, clear and fully fixed colours can be obtained on weighted silk when using said addition to printing pastes. A further improvement consists in that with the help of the solvent mentioned, dyestuffs insoluble in water can be dissolved and fixed fast on the various textile fibres by printing and steaming.

The methods of carrying out the process will be shown by the following examples.

*Example I.*

4 g. of chromazurol S conc. are dissolved in
26 g. of water. To this are added
8 g. of ethylenechlorhydrin,
54 g. of starch-tragacanth thickening and
8 g. of chromacetate 20° Bé.

100 g.

This mass is printed on weighted silk, fixed by steaming and washed.

*Example II.*

3 g. of acid orange A are dissolved in
57 g. of water. To this are added
8 g. of ethylenechlorhydrin,
30 g. of British gum thickening and
2 g. of ammonium oxalate.

100 g.

This is printed on unweighted silk, fixed by steaming and washed.

*Examples III and IV.*

1 g. of zinc free methylene blue is dissolved in
23 g. of water and
5 g. of acetic acid (80 per cent). To this are added
10 g. of ethylenechlorhydrin,
50 g. of starch-tragacanth thickening,
2 g. of tartaric acid 1:1 and
9 g. of tannin 1:1.

100 g.

The dyestuff is dissolved in water to which acetic acid has been added and the remaining ingredients of the printing paste are added in the order given in the recipe. Printing is done on cotton (III) or artificial silk (IV) which is then steamed and after the passage through tartar emetic, washed and soaped.

*Examples V and VI.*

2 g. of spirit-soluble solid blue R R are dissolved by heating on the water bath, in 15 g. of ethylenechlorhydrin. To this are added 83 g. of starch-tragacanth thickening.

100 g.

This is printed on chlorinated wool (V) or weighted silk (VI), fixed by steaming and washed.

*Examples VII and VIII.*

2 g. of spirit soluble solid blue R R are dissolved by heating on the water bath, in 15 g. of ethylenechlorhydrin. To this are added 71 g. of starch-tragacanth thickening and 12 g. of tannin 1:1.

100 g.

This is printed on cotton (VII) and steamed, passed through a tartar emetic bath and soaped. Or the same dye paste is printed on weighted silk (VIII), fixed by steaming and washed.

What I claim is:

1. A process for the preparation or printing pastes from organic dyestuffs, consisting in adding ethylenechlorhydrin to a dyestuff solution and a thickening.

2. As new products of manufacture, printing pastes containing together with a dyestuff and a thickening, ethylenechlorhydrin as further ingredient.

In witness whereof I have hereunto signed my name this 6th day of January, 1926.

HERMANN MÜLLER.